Feb. 13, 1940.   R. I. WAUGH   2,189,825
READING DEVICE FOR COMPUTING SCALES
Filed June 3, 1935   3 Sheets-Sheet 1

INVENTOR.
Robert I. Waugh
BY
ATTORNEYS.

INVENTOR.
Robert I Waugh
BY
ATTORNEYS.

Feb. 13, 1940. R. I. WAUGH 2,189,825
READING DEVICE FOR COMPUTING SCALES
Filed June 3, 1935 3 Sheets-Sheet 3

INVENTOR.
Robert I. Waugh
BY Edward E Bauer
ATTORNEYS.

Patented Feb. 13, 1940

2,189,825

UNITED STATES PATENT OFFICE 2,189,825

READING DEVICE FOR COMPUTING SCALES

Robert I. Waugh, Seattle, Wash.

Application June 3, 1935, Serial No. 24,703

14 Claims. (Cl. 88—1)

The present invention relates to computing scales of the character employing a cylindrical drum upon which is a chart marked off in vertical columns of price figures, the figures in the several columns being computed from given weight values whereby the operator is enabled to determine by the weight-responsive movement of the chart with recourse to a particular column the exact value of the sale. The invention particularly has reference to the character of scale in which is employed a shutter arrangement operating to expose a portion of only the particular column concerned in the sale being made.

My object, generally stated, is to provide in a shutter arrangement for scale use mechanism which minimizes if not entirely eliminates difficulties heretofore encountered and, in the achievement thereof, to perfect the shutters per se, the levers for operating the same, and the key-board through which the levers are controlled, as well as the lenses by means of which the figures are magnified to facilitate perception of the same.

More especially in connection with said lenses, a plurality of the same being employed with the range or vision of each being confined to a portion only of the scale chart, it is a particular object of my invention to provide means whereby the lenses are automatically shifted responsive to the exposure of columns lying in a plane of vision which includes or closely adjoins the line of juncture of contiguous lenses.

It is a still further and particular object of the invention to provide a scope through which the image of the figure exposed may be most effectively projected and in connection with which an indirect source of illumination is provided, said illuminating source being employed in a manner such that the light is most advantageously diffused and which is particularly arranged to eliminate the projection of shadows from the reading line to the visible surface of the chart.

A further object is to associate each of the several component parts of the invention in a compact assembly whereby, if desired, the invention may be utilized as an attachment allowing easy application of the same to conventional computing scales already in use without altering the construction of the scales in any manner, the housing therefor being designed to prevent filtration of light to or from the interior.

Further and particular objects and advantages will appear, together with the foregoing, in the following description and claims, the invention consisting in the novel construction, adaptation, and combination of parts illustrated as the now preferred embodiment in the drawings and hereinafter described and claimed.

In the drawings—

Figure 1 indicates the operator's side of a conventional computing scale with the present invention applied thereto.

Figure 9:
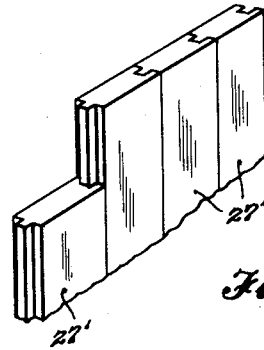

Fig. 9 indicates, in perspective, a modified form of shutter.

Figure 3:
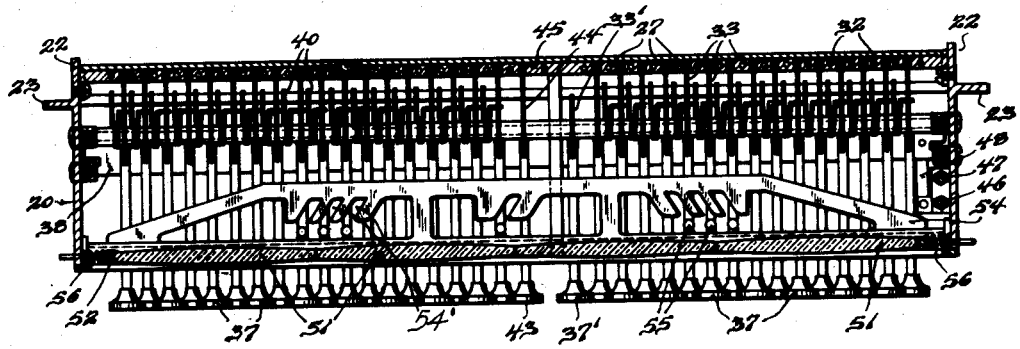
Fig. 3 is a horizontal section to a reduced scale taken on the line 3—3 of Fig. 2.
Figure 4:
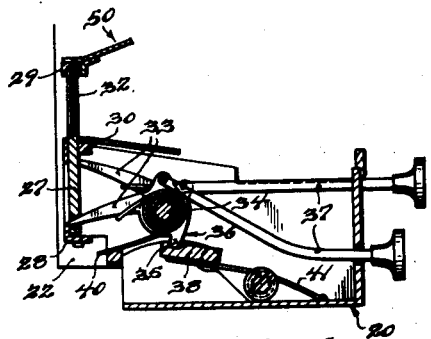
Fig. 4 is a detail transverse vertical section illustrating the lever control for the shutters, one of which is depressed to represent the opening of a shutter to expose a portion of a single chart column normally concealed thereby.
Figure 5:
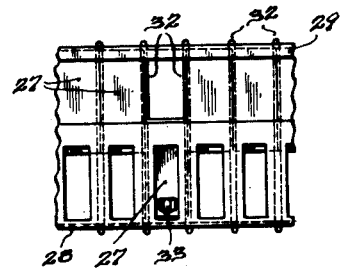
Fig. 5 is a detail rear elevation of a series of the shutters, one of which is open.
Figure 10:
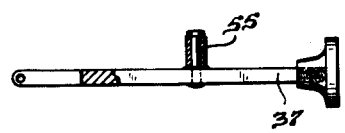
Figure 11:
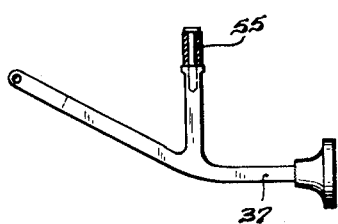

Figs. 10 and 11 are detail views of the keys which are employed in the upper and the lower bank of the key-board, respectively, for shifting the lenses, the location of such keys as respects the key-board being indicated in Fig. 3.

Figure 12:
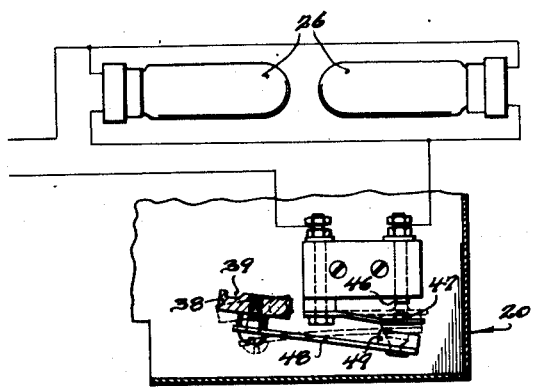
Figure 13:
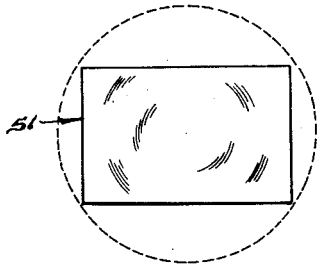

Fig. 12 is a detail transverse vertical section illustrating mechanism which is employed to energize the electric circuit which includes the chart-illuminating lamps automatically in response to the opening of the shutters, the electric circuit being shown somewhat fragmentarily; and Fig. 13 is a view indicating one of the complementary lenses used to produce a magnified image of the chart figures, dotted lines representing a plate of circular ground glass from which the lens is cut.

The scale mechanism is well known and it will suffice to state that the same comprises a housing represented in the drawings by the numeral 15 and within which a cylindrical drum 16 is revolubly carried, the drum being provided about its periphery with a chart having a weight-indicating column of figures lying adjacent the transverse median center of the drum and, at opposite sides thereof, a plurality of parallel columns of computed price figures. The housing is open at the operator's side of the scale to accommodate perception of the weight reading as well as the figures of a selected computation column, each being located by a horizontal reading line 17 fixed to the chart housing.

Fitting this opening, the present invention employs a casing 20 providing a snug fit against the drum housing along the upper and lower edges and at the two ends providing L-shaped vertical brackets one wall 22 of which projects into the drum housing with the other wall 23 extending laterally and overlying the same for connecting the casing 20, through the medium of screws 24, with the drum housing. The upper wall of the casing 20 forms an arched roof 25 which operates as a light compartment and in this compartment I provide a pair of electrically energized lamps 26 connected in a normally open circuit including a switch, hereinafter described, serving to close the circuit automatically in response to the opening of shutters which are provided for the several columns of price computations.

Having particular reference to these shutters, indicated by 27, the same are mounted for vertical slide movement at the inner end of the casing 20 in a rigid frame which includes a sill 28 and a head member 29 of a channel formation, said sill at the rear of the frame projecting upwardly to approximately the mid-height of the frame and co-acting with a longitudinally extending rib 30 spaced therefrom to receive the shutters between the same. The shutters are of a width to individually span a single column of the scale chart, normally seating in the channel of the head member and extending below the rib 30 with the lower extension being formed with an aperture 31 within which the toe of an operating lever is received. In the meeting edges of the shutters are vertical grooves which co-act to receive jamb-forming wire guides 32 strung between the sill and the head member. The shutters are particularly designed to prevent filtration of light between the meeting edges of the same, to simplify the frame construction therefor, and to increase their rigidity while decreasing frictional resistance resulting from binding. I represent in Fig. 9 a modified form 27', operating to a similar end, in which the shutters are formed with a tongue-and-groove interfit.

In connection with the operating levers referred to above and which I represent by 33, the same are fulcrumed for arcuate movement on a shaft 34 supported between the end walls of the casing and are actuated by keys 37 from an exposed two-bank key-board, each of the shutter-operating levers 33 being provided with a dog extension 35 one wall or edge of which forms a cam surface 36. Said dogs serve to engage a locking bar 38 pivotally mounted for rocking movement below the levers, lodging in a groove 39 formed in the upper surface of the bar for retaining a shutter in its open disposition in opposition to return wire springs 40, the cam surface 36 serving to depress the locking bar in releasing a previously opened shutter in advance of the locking action. A wire spring 41 is used to influence the locking bar into its elevated position.

Figure 6:
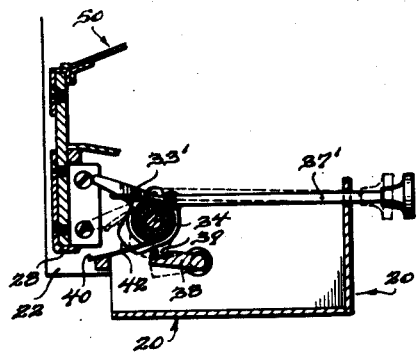
Fig. 6 is a detail transverse vertical section illustrating the release key and related structure by means of which the entire shutter-controlling key-board is returned to normal inoperative position.
Figure 7:
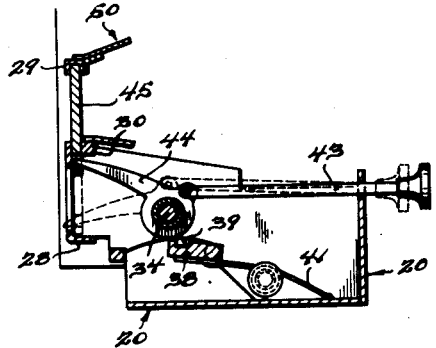
Fig. 7 is a detail transverse vertical section representing the friction lever employed to control a shutter for exposing the weight figures of the chart.
Figure 8:
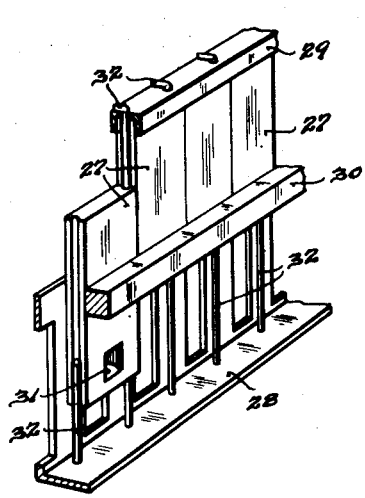
Fig. 8 is a perspective view of a series of the shutters and the supporting frame therefor.

Provided in the key-board is a release key 37' (Fig. 6) which operates a lever 33' formed with a bar-depressing cam nose 42, the key-board also providing a key 43 (Fig. 7) which operates a lever 44 serving to open and close a shutter 45 located to span the weight-indicating column of the chart, said shutter 45 being frictionally retained in its open disposition, preferably by frictional contact of the separating washers on the shaft 34 against the hub of the lever 44, and closed by a manual retraction of the key 43.

More especially as respects the lever-operating depression of the locking-bar 38, the dogs in their locked positions depress the bar to a position approximately mid-way of the bar's spring-influenced travel and attention is directed to Fig. 12 in which is represented the switch (hereinbefore referred to) for closing the circuit including the lamps 26, the switch comprising normally open circuit-closing terminals 46 and 47 which are closed responsive to depression of the locking bar 38 through the medium of a spring arm 48 carried by the locking bar and engaging the terminal 47 through a non-conductive block 49.

Above the key and lever mechanism a flared scope 50 is provided, the scope extending the width of the casing with the lower and the upper walls emanating, respectively, from the rib and head members of the shutter frame to extend in diverging relation into proximity of but spaced from the front wall of the casing. The inner wall of the scope is desirably coated with a non-reflective paint, preferably a dull black. Received in the space between said outer end of the scope and the casing are a plurality of lenses 51 supported in a frame 52 of less width than the casing opening and operating as a lense carriage, the lenses being contiguous with respect to one another and the carriage being mounted on upper and lower rails 53 rigid with the casing for limited sliding movement relative thereto. Secured to the lens carriage and extending horizontally below the lower wall of the scope, the invention provides a plate member 54 which, adjacent the transverse planes of the meeting lines of the several lenses, is formed with diagonal slots 54' (Fig. 3) operating to receive respective rollers 55 supported for rotary movement about vertical axes by the keys (Figs. 10 and 11) of such of the shutters as lie in positions the lines of vision to which would be interrupted by the meeting lines of the lenses in the normal location of the lenses. My invention is designed to permit the operator to stand at a central point in relation to the longitudinal dimension of the scale and, considering the spacing between the lenses and the shutters and the resulting refraction of the lines of vision as the same pass through the magnifying lenses from the central viewing point to end columns of the scale, it will be seen that the slots 54' must necessarily be related to lens-deflected rather than rectilineal lines taken from the operator to the end columns. Springs 56 at opposite ends of the lens carriage serve to normally center the same.

Figure 1:
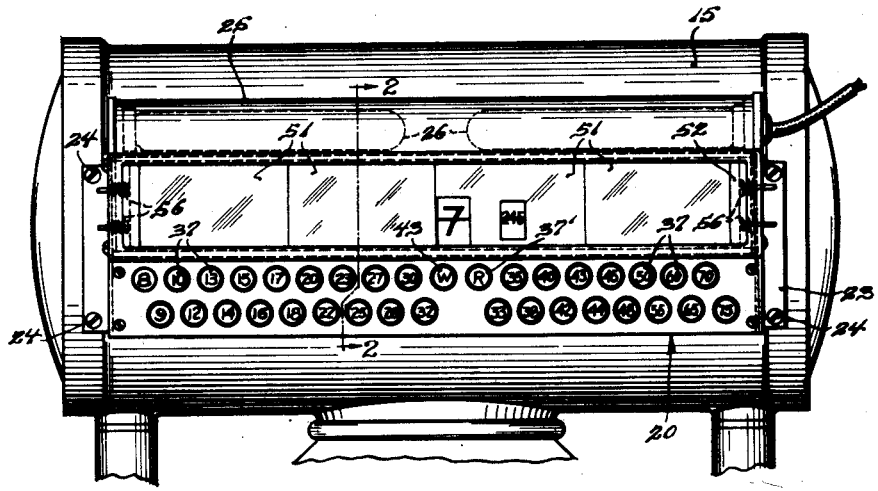
Figure 2:
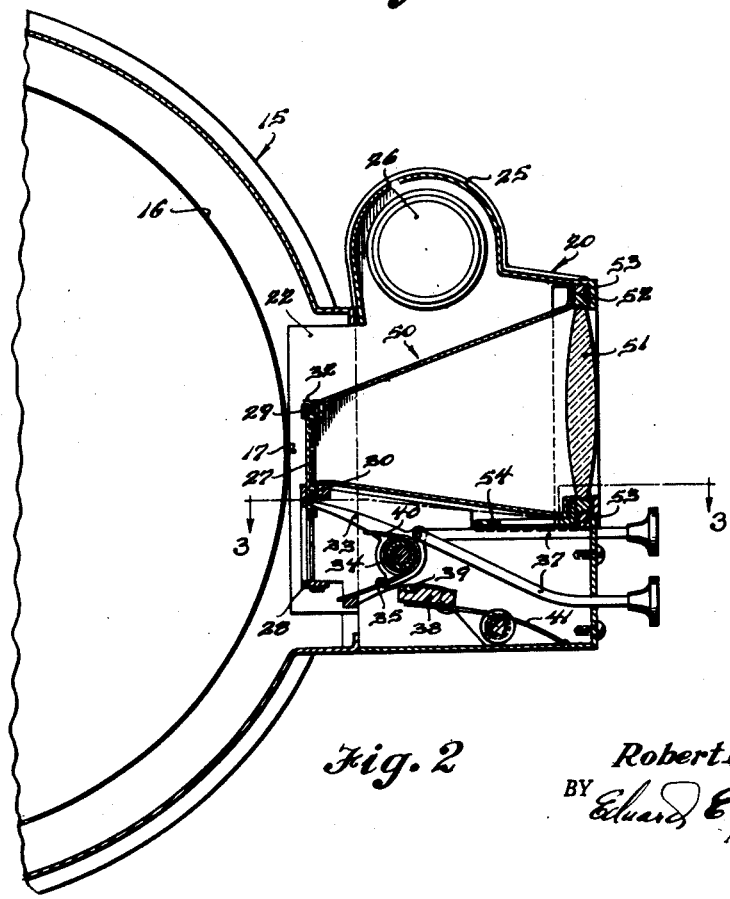
Fig. 2 is a transverse vertical section thereof taken to an enlarged scale on the line 2—2 of Fig. 1, parts of the scale proper being broken away.

In operating the scale reading mechanism, presuming that the article being sold is merchandised at 35¢ per pound, the operator places the merchandise on the scale platform (not shown) and presses the key 37 of the key-board marked "35", the key operating the lever about the axis of the shaft 34 to draw the shutter 27 related thereto into its open disposition with the cam surface 36 depressing the locking bar 38, the dog 35 passing over the lip of the locking bar and lodging in the groove 39 to lock the shutter in opposition to spring 40. The locking bar simultaneously acts through the spring arm 48 to elevate the block 49 in contacting the circuit-closing terminals 46 and 47 to complete a circuit through the lamps 26, the lamps being disposed (Fig. 2) in a manner to diffuse the light. Rays which enter the space between the shutters and the drum 16 are directed vertically to prevent the casting of a shadow from the reading line 17 on the visible surface of the chart. A magnified image of the figures "245" which represents the computed value of the sale are visible to the operator, no light other than that which displays the weight and the single computation being perceived through the lenses.

As a succeeding sale is made, the key 37 selected according to the value of the merchandise concerned depresses the locking bar 38 to release the previously opened shutter, the latter closing under the influence of the spring 40. Following a day's operation or as may otherwise be desired, the release key 37' is utilized to depress the locking bar in releasing the shutter which is open from a preceding sale, return of the locking bar to its uppermost position under the influence of the spring 41 opening the electric circuit to the lamps 26. The operation of the shifting lens carriage is believed clear, the roller 55, as a key 37 which supports the same is used, entering the related diagonal slot of the plate 54 to move the lens carriage longitudinally in opposition to the equalizing springs 56, the direction of movement of the carriage being either to the right or to the left, according to the direction of inclination of the slot concerned.

No particular reference to the rectangular lenses 51 is necessary except to point out that ordinary plates of circular ground glass, double-convex in form and relatively inexpensive, are especially efficient in the manner in which the same are employed.

Modifications of the invention will readily suggest themselves and I accordingly intend that the appended claims be given the breadth in their construction which is commensurate with the scope of the invention within the art.

What I claim is:

1. Reading structure for a computing scale of the character described comprising a flared member consisting of a structure formed with upper, lower, and side walls of which the upper and lower walls are relatively plane and diverge outwardly, the inner narrow end of the structure providing a sight opening extending the approximate length of the member through which a segment of the chart is adapted to be viewed, a shutter frame at said inner end of the flared member including a head member to which the upper wall of the flared member is connected and a rib member to which the lower wall of the flared member is connected, a plurality of shutters normally seating in the channel of the head member and supported by the frame for sliding movement in a vertical plane into and from the line of vision through the sight opening, said shutters being of a width to individually span a respective column of the scale chart and having an interfit, as between adjoining edges of the successive shutters, through the provision of a tongue and a groove in the opposite edges of the respective shutters which fit the groove and the tongue, respectively, of the adjacent shutters, said interfit of the lateral edges together with the channel of the head member acting to prevent filtration of light past the shutters, and means including keys corresponding to the respective shutters for opening and closing the same independently.

2. In combination with a computing scale of the character described employing a cylindrical chart marked in parallel columns of computed price figures, shutter mechanism therefor comprising a shutter frame formed to provide a head member and a sill member between which a plurality of wire strands are strung, the strands being located in parallel planes taken at right angles to the surface of the chart through the meeting lines between adjoining columns of the chart, and a plurality of shutters of a width to individually span a respective column of the chart, each shutter being formed in the two lateral edges with grooves fitting the wire strands to support the shutter for sliding movement between the head and sill members of the frame.

3. Structure for use with a computing scale of the character employing a cylindrical chart marked in parallel columns of computed price figures comprising a plurality of sliding shutters of a width to individually span a respective column of the scale chart, and a supporting frame therefor providing a sight opening normally closed by the shutters, said sight opening of the frame being bordered along the upper edge thereof by a head member having a channel therein of the approximate thickness of the shutters and along its lower edge by a rib member, the shutters in their closed positions seating in the channel of the head member and fitting against the side of the rib member to prevent filtration of light past the upper and lower edges, the shutters being formed in their lateral edges with means for preventing filtration of light between the shutters.

4. In combination with a computing scale of the character employing a cylindrical chart marked in parallel columns of computed price figures, shutter mechanism therefor comprising a shutter frame providing a sight opening through which a portion of the several columns of the chart is visible, a plurality of shutters supported in the shutter frame individually spanning a respective column of the scale chart and normally operating to collectively close the sight opening for concealing the visible surface of the chart, electrically energized lamps supported to illuminate said visible surface of the chart, an electric circuit therefor including normally open circuit-closing terminals, levers for the respective shutters and keys corresponding to the levers for opening the shutters, a locking bar supported for rocking movement in the path of movement of the levers and operating to engage the levers for maintaining an opened shutter in its open position, means provided by the levers acting to engage the locking bar for releasing a previously opened shutter from its open position, and means carried by said locking bar for closing the terminals to complete a circuit through the lamps in response to lever-influenced rocking movement of the locking bar.

5. A reading device for a computing scale of the character employing a chart mounted for weight-responsive movement and marked in parallel columns of computed price figures comprising a flared member consisting of a structure formed with upper, lower and side walls of which the upper and lower walls diverge outwardly, the inner narrow end of the structure providing a sight opening extending the approximate length of the member through which a segment of the chart is adapted to be viewed, a series of shutters of a width to individually span a respective column of the chart supported at said inner end of the flared member to act collectively in normally closing the sight opening for concealing chart figures visible through the sight opening, a series of manually-controlled levers engaging the respective shutters for opening and closing the same independently, and means at the outer wide end of the flared member comprising a lens carriage and a plurality of longitudinally aligned lenses supported thereby for magnifying the image of chart figures exposed by the opening of the shutters, said lens carriage being mounted for sliding movement longitudinally of the scale for shifting the lenses to prevent interruption, by the meeting line between adjoining lenses, of the line of vision to an exposed figure.

6. The defined structure of claim 5 together with means by which said lens carriage is shifted automatically in response to the opening of a shutter which exposes a figure the magnified image of which lies in a line of vision interfered with by the meeting line between adjoining lenses.

7. A reading device for a computing scale of the character which employs a cylindrical chart mounted for weight-responsive movement and in which the chart is marked in parallel columns of computed price figures extending about the chart periphery, said device comprising a flared member formed with upper, lower, and side walls of which the upper and lower walls diverge outwardly, the inner narrow end of the structure providing a sight opening through which a segment of the chart is adapted to be viewed, a sliding lens carriage supported by the flared member at the outer wide end of the same, a plurality of contiguous lenses carried by the lens carriage for magnifying chart figures exposed through the sight opening, shutters supported at said inner narrow end of the flared member movable into and from the sight opening and normally operating to close the sight opening, keys corresponding to the shutters for opening the same independently, and means for shifting the lens carriage longitudinally of the flared member automatically in response to the opening of a shutter lying in a line of vision which normally would be interrupted by the meeting line between adjoining lenses.

8. In combination with a scale of the character providing a movable chart marked in parallel columns of indicia, a reading device therefor comprising independently movable shutters for the respective columns operating to selectively conceal and expose portions of columns lying in the field of vision of the operator, a plurality of lenses each of which are arranged to magnify shutter-exposed indicia of predetermined groups of the columns, supporting means for the lenses mounted for sliding movement longitudinally of the chart, and mechanism having operative interconnection with the lens-supporting means and with the shutters operated automatically in response to the indicia-exposing operation of the shutters for locating said lens-supporting means in predetermined positions at which a related lens is effective to produce non-distorted magnification of the exposed indicia.

9. In combination with a chart marked in parallel columns of indicia, a reading device for the chart comprising a frame member, a magnification lens supported thereby to lie in spaced relation to the chart surface in the line of vision to the latter, a series of shutters for the respective columns of the chart, means supporting said shutters to locate the same between the lens and the chart surface in close proximity to the chart surface, means for moving said shutters independently into and from the line of vision, through said lens, to the chart surface whereby to conceal and expose the indicia of selected chart columns, and mechanism operatively engaging said lens and acting automatically in response to the opening of a shutter lying outside the focusing limits of the lens for shifting the lens to bring the shutter-exposed indicia within said focusing limits of the lens, the amplifying characteristics of the lens being such that particular shutters of the series normally lie in positions at which the lens is incapable of providing a magnified image of the indicia exposed thereby.

10. In combination with a chart marked in parallel columns of indicia, a reading device therefor comprising independently movable shutters for the respective columns operating to expose a portion of selected columns, a lens for magnifying shutter-exposed indicia of the chart columns arranged to lie in the line of vision of the operator and supported for sliding movement longitudinally of the chart, and shutter-controlled lens-governing mechanism, having operative interconnection with the lens, acting automatically in response to the indicia-exposing operation of the shutters for locating the lens in predetermined longitudinal positions whereat the exposed indicia lies within the focusing limits of the lens, the amplifying characteristics of the lens being such that the lens, in its normal location, is incapable of providing a magnified image of the indicia exposed by certain of the shutters.

11. In combination with a scale of the character providing an illuminated chart marked in parallel columns of indicia, a box-scope of major depth providing a sight opening at its inner end and supported in a position locating the sight opening immediately adjacent to and parallel with the surface of the chart in right angular relation to the columns, a shutter assembly supported at said inner end of the box-scope and comprising a series of shutters individually spanning a related column of the chart and operating collectively in their closed positions to seal the sight opening against passage of light, levers operatively interconnected with the respective shutters and manually operated keys for each of said levers for opening and closing the shutters independently for exposing the chart columns selectively, and means supported at the outer end of the box-scope for producing, to the view of the reader, a magnified image of the indicia exposed by an opened shutter.

12. In combination with a chart marked in parallel columns of indicia, a relatively deep box-scope for reading said indicia formed to provide a narrow and extended sight opening at the inner end thereof and a wide opening at the outer end, a mounting for said box-scope locating the sight opening immediately adjacent and parallel to the surface of the chart in right angular relation to the columns, a series of independently operated shutters mounted at the innermost limit of the box-scope, individually spanning a related column of the chart and operating collectively in their closed positions to seal the sight opening against passage of light, the location of said sight opening immediately adjacent the surface of the chart serving, as a selected shutter is opened, to confine the portion of the chart's surface visible to the operator in a manner such that only the column indicia related to the opened shutter is exposed to view and the indicia of adjoining columns concealed from view from all reading points within the viewing limits of the scope, and means mounted in the wide opening of the scope for producing, to the view of the reader, a magnified image of the indicia exposed by an opened shutter.

13. The combination, in a reading device for the purpose described, of a box-scope of major depth tapering lengthwise to provide a wide opening at the outer end and a narrow extended opening at the inner end, magnifying means supported in said wide opening of the box-scope, and an assembly of independently operated shutters supported at said inner end of the box-scope and operating collectively in the closed positions thereof to seal the narrow opening of the box-scope against passage of light, the shutter assembly providing means between adjacent side edges of adjoining shutters operating to interrupt direct rays of light for preventing filtration of said light rays past said side edges of the shutters.

14. A reading device for a computing scale of the character employing a chart marked in parallel columns of computed price figures and mounted for weight-responsive movement, said device comprising, in combination: a frame member; a magnification lens arranged to lie in spaced relation to the chart surface in the line of vision to the latter and characterized in that its amplification range, without movement of the lens, is insufficient to provide a magnified image of all of the chart columns to be viewed therethrough; a carriage for said lens supported by the frame member for sliding movement longitudinally of the chart to thereby increase the range of the lens by permitting the lens to be shifted in relation to the chart for bringing columns outside the focusing limits of the lens within said focusing limits; a series of manually-operated keys for the respective columns of the chart on each of which is a number corresponding to the number from which the price figures of the related column are computed; and mechanism operatively interconnecting said keys with the lens carriage and functioning automatically by actuation of a key related to a column outside the focusing limits of the lens to shift said lens carriage into a predetermined position whereat the lens provides non-distorted magnification of the weight-positioned figure of said column.

ROBERT I. WAUGH.